Figure 1:
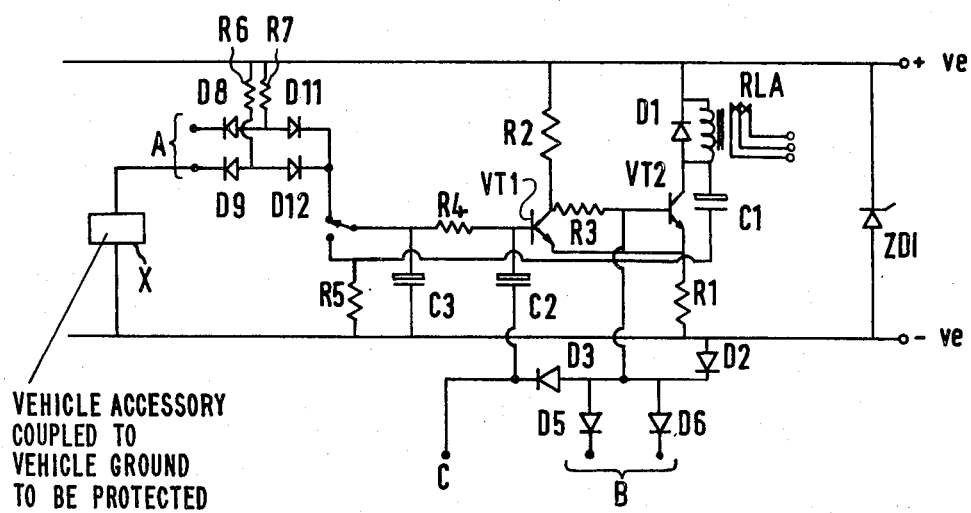

United States Patent [19]

Masterman

[11] 4,232,288
[45] Nov. 4, 1980

[54] VEHICLE ALARM

[76] Inventor: Raymond J. Masterman, 21 Hartfield Crescent, Wimbledon, London SW19, England

[21] Appl. No.: 935,842

[22] Filed: Aug. 22, 1978

[30] Foreign Application Priority Data

Aug. 23, 1977 [GB] United Kingdom .............. 35318/77

[51] Int. Cl.² ............................................. B60R 25/10
[52] U.S. Cl. ........................................ 340/63; 340/65; 340/568; 340/652; 307/10 AT
[58] Field of Search .................... 340/63, 64, 65, 568, 340/652, 662, 663, 664; 307/10 AT; 180/287

[56] References Cited

U.S. PATENT DOCUMENTS

| | | | |
|---|---|---|---|
| 3,614,734 | 10/1971 | Davis | 340/63 |
| 3,671,934 | 6/1972 | Teich | 340/63 |
| 4,037,194 | 7/1977 | Boyden et al. | 340/63 |

Primary Examiner—Alvin H. Waring
Attorney, Agent, or Firm—Cushman, Darby & Cushman

[57] ABSTRACT

Method and apparatus for detecting theft or tampering with a vehicle. The method includes monitoring the impedance of individual circuit elements within the electrical system and triggering an alarm whenever the impedance of a circuit element exceeds or falls below predetermined threshold levels. The apparatus includes a transistor switching circuit coupled through diode bridges to individual circuit elements of the vehicle's electrical system.

9 Claims, 2 Drawing Figures

VEHICLE ALARM

This invention relates to a theft and/or interference alarm for a vehicle.

Modern sophisticated large motor-cycles are often relatively expensive and have components which are expensive to replace. Because of this, when such motor-cycles are left in a public place they are prone to theft, both of the whole machine and of valuable parts and accessories. Other "open" vehicles suffer from the same risks, for example sports cars, light aircraft and power launches. Indeed, similar problems occur, although to a lesser extent with saloon cars.

Various alarm systems are available for the protection of vehicles. For example, car alarm systems are used in which a make or break in an electrical system is protected, generally by the introduction of one or more switches such as trembler switches, and used to trigger an alarm circuit.

In a saloon car, most of the valuable components are only accessible after a door has been opened and a switch detecting the door opening suffices to protect most parts of the vehicle. The same, however, cannot apply to motor-cycles and other open vehicles where expensive components such as headlights and engine parts are freely accessible. The number of parts which are to be monitored in such a vehicle is extremely large and monitoring the tampering with all of these components by the prior art methods would involve a complicated system extremely difficult to install.

It is an object of the present invention to provide an alarm for a vehicle such as a motor-cycle which mitigates the foregoing disadvantages and allows tampering with the readily accessible expensive components of an open machine to be readily monitored. It is also an object of the invention to provide such a system which may readily be installed, making maximum use of the equipment and wiring already provided on the vehicle.

According to one aspect of the present invention, there is provided a method of detecting interference with a vehicle having an electrical system formed of a plurality of circuits, which comprises monitoring the impedance of individual circuits of the electrical system and producing an alarm indication in response to a change in the impedance of any of the said individual circuits.

The invention in its one aspect therefore proposes a method of detecting interference which makes maximum use of the existing vehicle wiring harness.

The impedance may conveniently be monitored by applying a small quiescent current through the components to be protected. The current may be passed from a separate battery from the vehicle battery and the quiescent current is so small as to present a very small drain on the internal battery of the anti-theft alarm system.

In accordance with a second aspect of the invention, there is provided in a motor vehicle having an electrical system formed of a plurality of circuits powering electrical components of the vehicle, an alarm system comprising an impedance responsive device connected to individual circuits of the electrical system and operative to provide an alarm indication when the impedance of any of the said individual circuits crosses a respective predetermined threshold value.

In a further aspect of the invention, there is provided an anti-theft alarm system for a vehicle having a chassis and a plurality of components to be protected connected to the vehicle chassis, the system comprising a plurality of circuits connected by way of respective components to the chassis and an alarm device responsive to a change in the impedance in any of the said circuits to produce an alarm indication.

It will be appreciated that the invention only requires a relatively small change in impedance for detection of interference, unlike previous systems which only respond to very large changes of impedance such as when a circuit is suddenly opened or closed.

Figure 2:
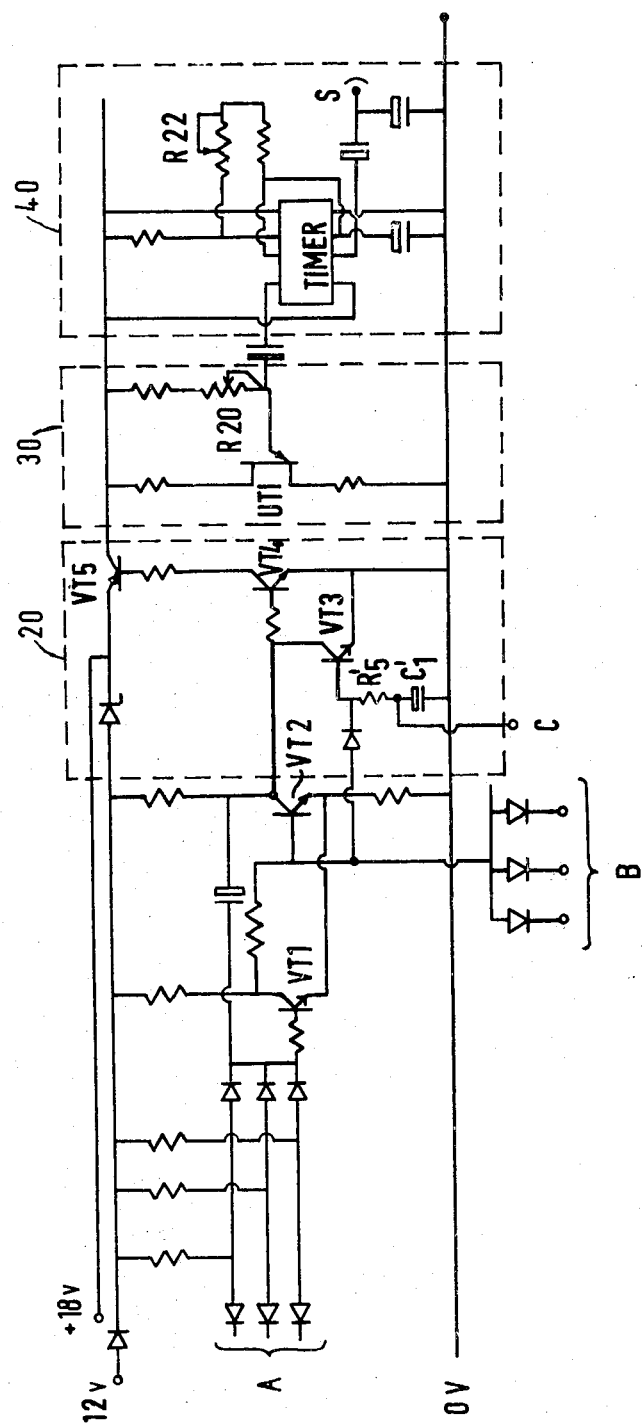

The invention will now be described further, by way of example, with reference to the accompanying drawings, in which:

FIG. 1 is a circuit of an alarm system in accordance with a first embodiment of the invention, and FIG. 2 is the circuit diagram of a preferred embodiment of the invention.

In FIG. 1, there is shown a switching circuit comprising two transistors VT1 and VT2. The emitters of the two transistors are connected to the negative terminal of the internal battery of the alarm system by way of a common resistor R1. The collector of the transistor VT2 is connected in series with the winding of the relay RLA, the latter being connected in parallel with a free wheeling diode D1. The collector of transistor VT1 is connected by way of a resistor R2 to the positive terminal of the battery and by way of a resistor R3 to the base of transistor VT2. The base of transistor VT1 is connected by way of a series combination of a resistor R4 and a capacitor C3 to the negative terminal of the battery.

The relay RLA has a set of contacts for energizing an electroacoustic transducer for producing an audible alarm and has further contacts which act as part of a timing circuit. One of the latter contacts is connected to the resistor R4 in the capacitor C3 and another is connected by way of a resistor R5 to the negative terminal of the battery and by way of a capacitor C1 to the collector of transistor VT2. The circuit R5, C1 is a timing circuit which maintains the relay energized for a predetermined time each time tampering is detected so that the relay should not remain on indefinitely to flatten the battery in the event of accidental triggering. A zener diode ZD1 is provided across the battery terminals to stabilize the applied voltage.

The switching circuit formed of the transistors VT1 and VT2 may be triggered from one of three sets of sensing terminals A, B and C. The terminals B are connected by way of respective diodes D5, D6 to the base of transistor VT2, the base being connected to the negative terminal by way of a diode D2. The terminal C is connected to the base of transistor VT1 by way of a capacitor C2 and to the base of transistor VT2 by way of a diode D3. The terminals A are each connected by way of a pair of oppositely biased series connected diodes D8, D11 or D9, D12 to one of the contacts of the relay RLA, the junction between each pair of diodes being connected to the positive terminal of the battery by way of a respective resistor R7, R6.

The circuit of FIG. 1 operates as follows. In the normal state, the transistor VT2 is biased ON by resistors R2 and R3 while the transistor VT1 is OFF. In this state, the relay RLA is energized and disconnects the alarm device from the battery and sets its timing contacts to the position shown in FIG. 1.

The contacts B are connected to circuits which establish a connection to the vehicle earth, that is to say the negative terminal of the battery when tampered with. For example, in a motor-cycle provided with a neutral indicator lamp connected to a switch associated with the gear box, the switch closes when the vehicle is placed in neutral to energize the indicator lamp and if one of the leads B is connected to the switch it will require a connection to earth through the indicator bulb when the vehicle is placed in neutral. Other switches which close when tampered with include the brake light switch or a switch provided on the clutch lever of a motor-cycle. If the base of transistors VT2 is connected to earth by way of an impedance which has less than a predetermined value, then it will switch off and cut off the winding current to the relay RLA. The alarm then sounds and the timing contacts of the relay change to the other position in which the resistor R4 is connected to the resistor R5. The positive charge transferred to the capacitor C1 is now applied by way of resistor R4 to switch the transistor VT1 ON and maintain the transistor VT2 OFF until such time as the timing circuit C5, R1 discharges and the condition which initiated the alarm is removed.

The lead C is connected to the terminal of the ignition switch connected to the vehicle battery. If the battery is disconnected then the sudden change in voltage is applied by way of the capacitor C2 to switch ON this transistor which in turn causes the transistor VT2 to switch OFF and generate an alarm condition.

The terminals A are intended for connection to components such as a spotlight, a headlight or other vehicle accessory which if stolen from the vehicle will involve a connection to earth being broken. To detect this, in the case of the component X connected to the diode D9 a current is made to flow through the component X by way of the resistance R6 and the diode D9. The resistor R6 is very large and will be dimensioned in dependence upon the internal resistance of the component X. When the motor-cycle or vehicle is normally in an unattended state a quiescent current will flow through the resistor R6 and the resulting voltage on the anode of diode D9 would be applied by way of a diode D12 to the base of transistor VT1 such that the latter should remain OFF. In the event of the component X being disconnected the voltage at the junction of the diode D9 and D12 will suddenly rise resulting in the transistors VT1 being switched ON and in turn switching OFF the transistor VT2 to produce an alarm condition.

It will be appreciated that the diodes D8, D9, D11 and D12 constitute a diode gate as do the diodes D3, D5 and D6. The diode D1 is a free wheeling diode to prevent any damage to the transistor VT2 when the winding current of the relay RLA is suddenly cut off.

The circuit in FIG. 2 is generally similar to that already described with reference to FIG. 1 and will therefore not be described in as much detail. The arrangement of transistors VT1 and VT2 and the diode gates connected to the terminals A and B is as described and operates to switch transistor VT2 OFF whenever either a high impedance is detected on one of the terminals A or a low impedance is detected on the terminal B. Instead of operating a relay, in the arrangement of FIG. 2, the transistor VT2 operates a solid state switching circuit 20 formed of transistors VT3, VT4 and VT5. The circuit 20 is arranged so that transistor VT5 conducts when transistor VT2 ceases to conduct and remains conductive for a time determined by the timing circuit C1', R5'. The junction between the resistor R5' and the capacitor C1' is connected to the terminal C which detects disconnection of the vehicle battery.

When the transistor VT5 is conductive it supplies power to two further circuits 30 and 40 which replace the horn connected to the relay contacts in the embodiment of FIG. 1. The circuits 30 and 40 operate to produce a high pitched sound in intermittent bursts. The frequency of the bursts is determined by the circuit 30 which is a conventional timing circuit formed of a unijunction transistor UT1 and whose frequency is determined by the adjustable resistor R20. The circuit 30 intermittently operates the circuit 40 which is a conventional 555 timer integrated circuit connected as an astable multivibrator the frequency of which is variable by means of a variable resistor R22. A loudspeaker is connected to the output socket S. The pitch of the sound produced by the loudspeaker is determined by the setting of the resistor R22 and the repetition frequency of the bursts is determined by the resistor R20. The time for which the alarm remains operative is determined by the timing circuit in the switching stage 20.

The purpose of circuit elements not described in detail will be self evident to a person skilled in the art.

In addition to being able to protect the accessories of a motor-cycle, the invention enables luggage carried on a motor-cycle to be protected in that a wire may be wrapped around the luggage and connected to a point on the vehicle chassis. If such a wire is connected to one of the terminals A its interruption to interfere with the luggage will result in an alarm being produced. Since the circuit 10 discriminates between different levels of impedance it may be set so as not to be affected by poor contact resistances as they occur in practice owing to corrosion of the parts establishing electrical connections.

The invention may be used to monitor substantially all the accessories on a motor-cycle without extensive rewiring since use is made of the existing wiring harness to determine tampering with any individual component. This facility enables the alarm to be fitted readily to a motor-cycle and the installation may be effected by a non-expert owner.

Throughout the specification, references made to high impedances may be taken as a reference to an impedance greater than 200 ohms while references to a low impedance indicate an impedance of less than 200 ohms. 200 ohms is a typical threshold impedance for the alarm system but other thresholds may alternatively be selected depending on the nature of the circuit and the vehicle.

If it is additionally desired to detect a sudden movement of the machine such as may occur it the motor-cycle should fall or be hit by another vehicle, a trembler switch or a magnetic re-switch may be provided. Preferably, the trembler switch may comprise a small amount of mercury in a curved tube with a second contact arrangement vertically above the mercury. In such a trembler switch, slow swaying movements do not result in deformation of the mercury but only in the mercury being moved from side to side so that the trembler switch is not actuated. On the other hand, a sudden jerk will result in deformation of the blob of mercury making contact and closing the switch for a sufficient time for an alarm to be produced.

It is preferable that the alarm be provided with its own batteries so that an alarm signal may be produced in the event of tampering with the vehicle battery to switch the alarm system on and off, that is to say to activate it, a key operated switch may be provided on the motor-cycle arranged in the power supply lead from the internal battery.

The facility for varying the frequency and pitch in the second embodiment of the invention enables each owner to recognize an alarm produced by his own machine which is important if the vehicle is left parked among other vehicles also fitted with an alarm.

I claim:

1. A vehicle alarm system comprising:
   an alarm;
   means for coupling a first vehicle accessory to said alarm for triggering said alarm whenever the magnitude of the impedance from said first vehicle accessory to vehicle ground is greater than a first predetermined threshold level;
   means for coupling a second vehicle accessory to said alarm for triggering said alarm whenever the magnitude of the impedance from said second vehicle accessory to vehicle ground is less than a second predetermined threshold level; and
   means for coupling said alarm to a vehicle battery for triggering said alarm whenever said vehicle battery is electrically disconnected from said alarm.

2. A vehicle alarm system according to claim 1 further comprising:
   means for maintaining said alarm in an alarm condition for a predetermined minimum time interval after it has been triggered.

3. A vehicle alarm according to either of claims 1 or 2 further including a trembler switch for triggering said alarm whenever said vehicle is moved.

4. A method for detecting vehicle theft or tampering comprising the steps of:
   monitoring the impedance from a first vehicle accessory to vehicle ground by passing a current from an alarm battery through the first vehicle accessory;
   triggering an alarm whenever the impedance from the first vehicle accessory to vehicle ground is greater than a first predetermined threshold level;
   monitoring the impedance from a second vehicle accessory to vehicle ground; and
   triggering an alarm whenever the impedance from the second vehicle accessory to ground is less than a second predetermined threshold.

5. A method according to claim 4 further including the steps of:
   monitoring the voltage of a vehicle battery; and
   triggering an alarm whenever the vehicle battery is electrically disconnected from the vehicle.

6. A vehicle alarm system comprising:
   a switching circuit for activating an alarm relay having first, second and third control inputs and an output;
   an alarm relay having a control input and a first switch output, said control input coupled to said switching circuit output and said first switch output for coupling to an alarm; and
   a biased diode bridge coupled to said first control input of said switching circuit and for coupling to a vehicle accessory normally coupled to vehicle ground;
   said second control input of said switching circuit for coupling to a vehicle accessory that is grounded only when the vehicle is operating;
   said third control input for coupling to the vehicle's battery;
   said switching circuit biased such that it will be triggered and in turn trigger said alarm relay whenever the impedance between said biased diode bridge, through a vehicle accessory to vehicle ground is greater than a first predetermined threshold level, said switching circuit also biased to switch and trigger said alarm whenever the impedance between said second control input and vehicle ground drops below a second predetermined threshold level, said switching circuit also biased to be triggered whenever said third control input is disconnected from the vehicle battery.

7. A vehicle alarm system according to claim 6 further comprising:
   a second switch output of said alarm relay; and
   a timing circuit coupled by said second switch output of said alarm relay between said first control input and said output of said switching circuit for latching said relay for a predetermined time interval thereby establishing a minimum alarm time after said switching circuit has been triggered.

8. A vehicle alarm according to either of claims 6 or 7 further including a trembler switch for triggering said alarm relay whenever said vehicle is moved.

9. A vehicle alarm according to either of claims 6 or 7 wherein said switching circuit comprises:
   a first transistor biased to be conducting when not triggered by one of said first, second or third control inputs; and
   a second transistor biased to be nonconducting and having its base coupled to the collector of said first transistor, the output of said switching circuit taken as the collector of said second transistor, said first control input coupled to the base of said first transistor, said second control input diode coupled to the base of said first transistor, diode coupled to the base of said second transistor, and diode/resistor coupled to the emitter of said second transistor, whereby triggering of said switching circuit through any of said control inputs causes said first and second transistors to change state.

* * * * *